United States Patent
Wang et al.

(10) Patent No.: US 6,967,231 B1
(45) Date of Patent: Nov. 22, 2005

(54) OLEFIN POLYMERIZATION PROCESS

(75) Inventors: Shaotian Wang, Mason, OH (US); Douglas D. Klendworth, West Chester, OH (US); Mark K. Reinking, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 10/948,019

(22) Filed: Sep. 23, 2004

(51) Int. Cl.$^7$ ............................. C08F 4/50; C08F 4/64; C08F 4/44
(52) U.S. Cl. ................ 526/123.1; 526/172; 526/124.2; 526/124.3; 526/161; 526/134
(58) Field of Search ........................... 526/123.1, 124.2, 526/124.3, 125.3, 124.5, 161, 172, 134

(56) References Cited

U.S. PATENT DOCUMENTS

| | | | |
|---|---|---|---|
| 4,082,692 A * | 4/1978 | Goldie ..................... 502/106 |
| 4,330,649 A | 5/1982 | Kioka et al. ............... 526/125 |
| 4,421,674 A | 12/1983 | Invernizzi et al. .......... 502/154 |
| 4,439,539 A * | 3/1984 | Takitani et al. ............. 502/112 |
| 4,634,750 A * | 1/1987 | Best ........................... 526/129 |
| 4,937,300 A * | 6/1990 | McDaniel ................. 526/124.6 |
| 5,106,807 A | 4/1992 | Morini et al. ............... 502/121 |
| 5,173,465 A | 12/1992 | Luciani et al. ............. 502/107 |
| 5,192,731 A * | 3/1993 | Kioka et al. ................ 502/110 |
| 5,534,472 A | 7/1996 | Winslow et al. ............ 502/116 |
| 6,211,311 B1 | 4/2001 | Wang et al. ................ 526/131 |
| 6,232,260 B1 | 5/2001 | Nagy et al. ................. 502/155 |
| 6,440,889 B1 | 8/2002 | Tsuie .......................... 502/152 |
| 6,451,724 B1 | 9/2002 | Nifant'ev et al. ............ 502/103 |
| 6,541,583 B2 | 4/2003 | Meverden et al. .......... 526/127 |
| 6,559,251 B1 | 5/2003 | Wang et al. ................. 526/127 |
| 6,583,242 B2 * | 6/2003 | Wang et al. ................. 526/161 |
| 6,713,585 B1 | 3/2004 | Mavridis et al. ............ 526/352 |
| 2004/0157727 A1 * | 8/2004 | Lu et al. ..................... 502/102 |

FOREIGN PATENT DOCUMENTS

WO   WO 99/24446   11/1998
WO   WO 01/53360   7/2001

OTHER PUBLICATIONS

Ye et al. (J. Polym. Sci., Part A: Polym. Chem., 2002, 40, 3112-3119.*
Buu-Hoi and Xuong, *J. Chem. Soc.* (1952) 2225.
Jüet al., *J. Organometal, Chem. 460* (1993) 191.
Noh, et al., *J. Organometal. Chem. 580* (1990) 90.
Noh, et al., *J. Organometal. Chem. 518* (1996).
Ye, et al., *J. Polym. Sci., Part A: Polym. Chem. 40* (2002) 3112.
Sozzani, et al., *J. Am. Chem. Soc. 125* (2003) 12881.
Bart et al., *J. Mat. Sci. 30* (1995) 2809.
R. Shroff and H. Mavridis, *J. Appl. Polym. Sci. 57* (1995) 1605.

* cited by examiner

*Primary Examiner*—David W. Wu
*Assistant Examiner*—Rip A. Lee
(74) *Attorney, Agent, or Firm*—John Tyrell; Jonathan L. Schuchardt

(57) ABSTRACT

A process for polymerizing ethylene is disclosed. A magnesium chloride-alcohol is used to support an organometallic complex comprising a Group 3 to 10 transition metal and an indenoindolyl ligand. The supported organometallic complex is mixed with an activator and ethylene and the ethylene is polymerized. Use of magnesium chloride containing an alcohol as the support provides an unexpected boost in catalyst activity and improves polymer rheological properties.

13 Claims, No Drawings

OLEFIN POLYMERIZATION PROCESS

FIELD OF THE INVENTION

This invention relates to a process for polymerizing ethylene in the presence of an activator and a magnesium chloride-alcohol supported organometallic complex. The process gives improved catalyst activity and polyethylene with good rheology.

BACKGROUND OF THE INVENTION

Many olefin polymerization catalysts are known, including conventional Ziegler-Natta catalysts. While these catalysts are inexpensive, they exhibit low activity and are generally poor at incorporating α-olefin comonomers. To improve polymer properties, single-site catalysts, in particular metallocenes, are beginning to replace Ziegler-Natta catalysts.

Magnesium chloride-supported catalysts are known and the combination of alcohols with magnesium chloride is known for Ziegler-Natta catalysts (see, for example, U.S. Pat. Nos. 4,330,649, 4,421,674, 5,106,807, and 5,173,465 and references therein). Generally, alcohols are used to improve the stereospecificity in propylene polymerizations.

Catalyst precursors that incorporate a transition metal and an indenoindolyl ligand are known. U.S. Pat. Nos. 6,232,260 and 6,451,724 disclose the use of transition metal catalysts based upon indenoindolyl ligands, but they have no examples using supported catalysts. While they mention that supported catalysts may be used, magnesium chloride is not mentioned and little information is given about the preparation of the supported catalysts.

WO 01/53360 discloses open architecture indenoindolyl catalysts that may be supported. Magnesium halides are included in the listing of possible inert supports, but no further information is given. In the single example (Example 8) preparing a supported catalyst, a solution of the catalyst is added to a polyethylene support. There is no indication as to the suitability of a magnesium chloride-alcohol support.

U.S. Pat. No. 6,559,251 discloses a process for polymerizing olefins with a silica-supported, indenoindolyl Group 4–6 transition metal complex having open architecture. Magnesium chloride supports are not disclosed.

U.S. Pat. No. 6,541,583 discloses a process for polymerizing propylene in the presence of a Group 3–5 transition metal catalyst that has two non-bridged indenoindolyl ligands. None of the examples uses a supported catalyst. They state that the catalyst can be immobilized on a support and include magnesium chloride in a list of preferred supports, but they give no process details. There is no indication as to the suitability of a magnesium chloride-alcohol support.

U.S. Pat. No. 6,211,311 prepares supported catalysts containing heteroatomic ligands. The list of supports includes magnesium chloride. The support is chemically modified with an organoaluminum, organosilicon, organomagnesium or organoboron compound for improved catalyst stability and activity. There is no indication as to the suitability of a magnesium chloride-alcohol support.

Pending application Ser. No. 10/834,425, filed Apr. 29, 2004, discloses the polymerization of ethylene in the presence of a supported indenoindolyl complex having open architecture. Magnesium chloride is included in the list of preferred supports. No process details are given for magnesium chloride. Silica is the only support material used in the examples. There is no indication as to the suitability of a magnesium chloride-alcohol support.

U.S. Pat. No. 6,583,242 teaches a catalyst system which comprises a support having a mean particle size less than about 30 microns, wherein the support is chemically treated with an alumoxane and an organometallic complex containing at least one indenoindolyl ligand and an activator. All of the examples use silica as a support material. Magnesium chloride is listed as a preferred support material, but again, there is no indication as to the suitability of a magnesium chloride-alcohol support.

Despite the considerable work that has been done with supporting catalysts based upon indenoindolyl ligands, there is a need for improvement, especially with regard to increasing catalyst activity and improving polymer rheology. Magnesium chloride-alcohol supports have apparently not been used in conjunction with organometallic complexes that incorporate indenoindolyl ligands. Alcohols and other protic materials are generally considered to deactivate single-site catalysts, the opposite of the effect we have found when the magnesium chloride-alcohol supports are used with complexes containing indenoindolyl ligands.

SUMMARY OF THE INVENTION

The invention is a process for polymerizing ethylene. An organometallic complex comprising a Group 3 to 10 transition metal and an indenoindolyl ligand is supported on magnesium chloride-alcohol. The supported organometallic complex is mixed with an activator and ethylene and the ethylene is polymerized. Use of magnesium chloride containing an alcohol as the support provides an unexpected boost in catalyst activity and improves polymer rheological properties.

DETAILED DESCRIPTION OF THE INVENTION

The process of the invention uses a supported organometallic complex. The complex contains a Group 3 to 10 transition metal. Preferably the transition metal is a Group 3–5 transition metal, more preferably a Group 4 transition metal. Most preferably, the transition metal is zirconium.

The organometallic complex contains at least one indenoindolyl ligand bonded to the transition metal. "Indenoindolyl" ligands are conveniently generated by deprotonating an indenoindole compound using a potent base. By "indenoindole compound," we mean an organic compound that has both indole and indene rings. The five-membered rings from each are fused, i.e., they share two carbon atoms. The rings can be fused such that the indole nitrogen and the only sp³-hybridized carbon on the indenyl ring are "trans" to each other. Such is the case in an indeno[1,2-b]indole ring system such as:

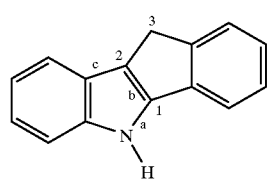

Suitable ring systems also include those in which the indole nitrogen and the sp³-hybridized carbon of the indene are beta to each other, i.e., they are on the same side of the molecule. This is an indeno[2,1-b]indole ring system:

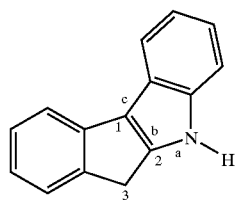

The ring atoms can be unsubstituted or substituted with one or more groups such as alkyl, aryl, aralkyl, halogen, silyl, nitro, dialkylamino, diarylamino, alkoxy, aryloxy, thioether, or the like. Additional fused rings can be present, as long as an indenoindole moiety is present.

Numbering of indenoindoles follows IUPAC Rule A-22. The molecule is oriented as shown below, and numbering is done clockwise beginning with the ring at the uppermost right of the structure in a manner effective to give the lowest possible number to the heteroatom. Thus, 5,10-dihydroindeno[1,2-b]indole is numbered as follows:

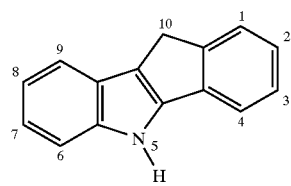

while 5,6-dihydroindeno[2,1-b]indole has the numbering:

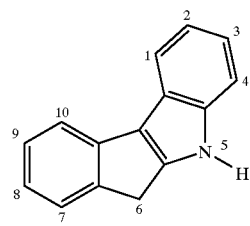

For correct nomenclature and numbering of these ring systems, see the *Ring Systems Handbook* (1998), a publication of Chemical Abstracts Service, Ring Systems File II: RF 33986-RF 66391 at RF 58952 and 58955. (Other examples of correct numbering appear in PCT Int. Appl. WO 99/24446 and U.S. Pat. No. 6,440,889.)

Methods for making indenoindole compounds are well known. Suitable methods and compounds are disclosed, for example, in U.S. Pat. No. 6,232,260, the teachings of which are incorporated herein by reference, and references cited therein, including the method of Buu-Hoi and Xuong, *J. Chem. Soc.* (1952) 2225. Suitable procedures also appear in PCT Int. Appls. WO 99/24446 and WO 01/53360.

The indolyl nitrogen of each indenoindolyl group is typically substituted with an alkyl, aryl, dialkylboryl, or a trialkylsilyl group.

Optionally, the indenoindolyl ligand is a bridged indenoindolyl ligand. By "bridged indenoindolyl ligand," we mean that the indenoindolyl group can be joined to a second ligand by a divalent linking group. A wide variety of linking groups are suitable for use and are described in the art. The linking group can be a conjugated pi-electron system, but it need not be conjugated. Suitable divalent linking groups include dialkylsilyl, diarylsilyl, alkylboranyl, arylboranyl, siloxy, polysiloxy, and hydrocarbyl groups. Preferred hydrocarbyl groups are alkylene, dialkylene, polyalkylene, arylene, diarylene, polyarylene, cycloalkyl, adamantyl, aralkylene, alkenyl, and alkynyl. Specific examples of suitable divalent linking groups are methylene, 1,2-ethenyl, 1,2-ethynyl, isopropylidene, 1,4-phenylene, α,α'-xylyl, 4,4'-biphenylene, 1,3-adamantyl, 1,4-adamantyl, phenylboranyl, methylboranyl, dimethylsilyl, diphenylsilyl, bis(dimethylsilyl), oxybis(dimethylsilyl), and the like. These and other divalent linking groups are described in the background references. (For some examples, see *J. Organometal. Chem.* 460 (1993) 191; 518 (1996) 1; 580 (1999) 90.)

The divalent linking group can link the indenoindolyl ligand to a polymerization-stable ligand. Suitable polymerization-stable ligands include cyclopentadienyl, indenyl, fluorenyl, boraaryl, indenoindolyl, and the like.

Bridged indenoindolyl ligands also include those used in open architecture complexes. By "open architecture," we mean a complex having a fixed geometry that enables generation of a highly exposed active site when the catalyst is combined with an activator. The metal of the complex is pi-bonded to the indenyl Cp ring and is also sigma-bonded through two or more atoms to the indolyl nitrogen or the indenyl methylene carbon. Preferably, the metal is sigma-bonded to a heteroatom, i.e., oxygen, nitrogen, phosphorus, or sulfur; most preferably, the metal is sigma-bonded to nitrogen. The heteroatom is linked to the indenoindolyl group through a bridging group, which is preferably dialkylsilyl, diarylsilyl, methylene, ethylene, isopropylidene, diphenylmethylene, or the like. Particularly preferred bridging groups are dimethylsilyl, methylene, ethylene, and isopropylidene. The bridging group is covalently bonded to either the indolyl nitrogen atom or the indenyl methylene carbon.

Preferred indenoindolyl ligands have a structure selected from the group consisting of:

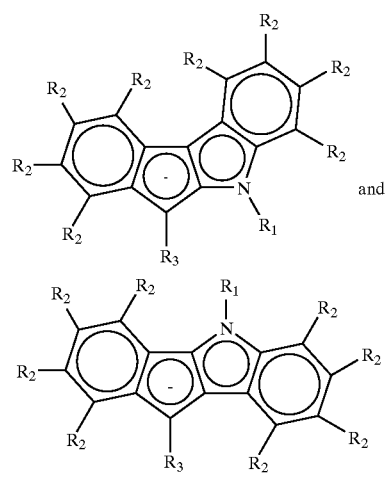

and in which $R_1$, is selected from the group consisting of $C_1$–$C_{30}$ hydrocarbyl, dialkylboryl, and trialkylsilyl; each $R_2$ is independently selected from the group consisting of $C_1$–$C_{30}$ hydrocarbyl, H, F, Cl and Br; $R_3$ is selected from the group consisting of $R_2$ and divalent radicals bonded to a second ligand wherein the divalent radical is selected from the group consisting of hydrocarbyl and heteroatom-containing alkylene radicals, diorganosilyl radicals, diorganogermanium radicals and diorganotin radicals.

Additionally, the complex includes ancillary ligands that are bonded to the metal and satisfy the valence of the metal. The ancillary ligands can be labile or polymerization-stable, but usually at least one labile ligand (such as halides, alkoxys, aryloxys, alkyls, arylalkyls, aryls, dialkylaminos, or the like) is present. Particularly preferred labile ligands are halides, alkyls, arylalkyls (e.g., chloride, methyl, benzyl) and aryloxys (e.g. phenoxy).

Preferably, the indenoindolyl complex has the general structure:

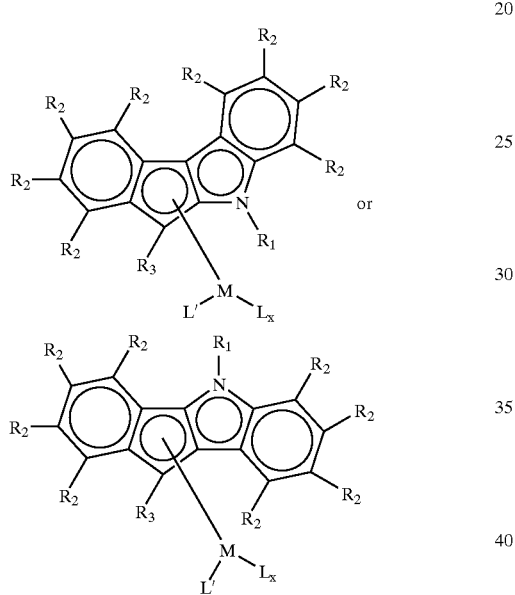

wherein M is a Group 3 to 10 transition metal; each L is independently selected from the group consisting of halide, alkoxy, aryloxy, siloxy, alkylamino, and $C_1$–$C_{30}$ hydrocarbyl; L' is selected from the group consisting of alkylamido, substituted or unsubstituted cyclopentadienyl, fluorenyl, indenyl, boraaryl, pyrrolyl, azaborolinyl and indenoindolyl; x satisfies the valence of M; and $R_1$, $R_2$, and $R_3$ are as previously defined.

The unsupported complexes can be made by any suitable method; those skilled in the art will recognize a variety of acceptable synthetic strategies. Often, the synthesis begins with preparation of the desired indenoindole compound from particular indanone and arylhydrazine precursors. Treatment with base gives a ligand precursor. The ligand precursor can then be reacted with a transition metal containing the appropriate ligands. If a bridged complex is desired, the indenoindole is linked with a second polymerization-stable ligand to give a linked ligand precursor. The final step then normally involves reaction of the ligand precursor with a transition metal source to give the organometallic complex. The exact synthetic steps and the sequence used will normally depend upon the other ligands used and the transition metal source.

Exemplary indenoindolyl complexes:

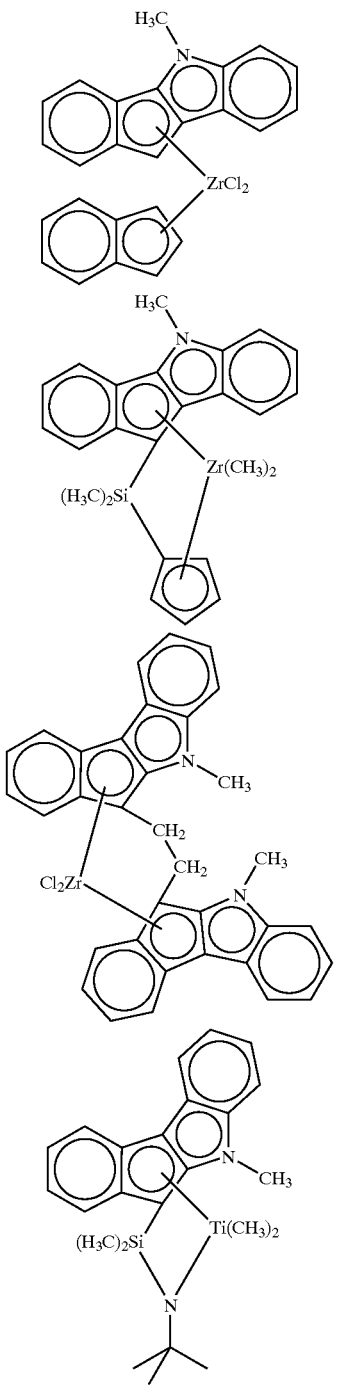

The amount of organometallic complex added per g support material is preferably from 0.01 mmol per gram to 0.8 mmol per gram.

The alcohol in the magnesium chloride-alcohol support is preferably a $C_1$ to $C_{16}$ alcohol, more preferably, a $C_1$ to $C_4$ alcohol such as methanol, ethanol, isopropyl alcohol or n-butanol. Most preferably, the alcohol is ethanol.

There are various methods for the preparation of magnesium chloride-alcohol supports (see *J. Polym. Sci., Part A: Polym. Chem.* 40 (2002) 3112; *J. Am. Chem. Soc.* 125 (2003) 12881; *J. Mat. Sci.* 30 (1995) 2809; and references therein). In one preferred method, anhydrous magnesium chloride is stirred with the desired stoichiometric amount of dry alcohol. Paraffin oil is added and the mixture is heated with stirring. After two to three hours of stirring, the mixture cools to room temperature and the solid magnesium chloride-alcohol support is filtered, washed with hexane, and vacuum dried.

In another preferred method, anhydrous magnesium chloride is dissolved in hot alcohol with stirring, and the solution is concentrated with heat and vacuum. Cooling and filtration affords crystals which are then vacuum dried to give the magnesium chloride-alcohol support.

Preferably, the molar ratio of alcohol to magnesium should be from about 1:1 to about 15:1, more preferably from about 2:1 to about 6:1. Most preferably, the ratio is from about 2.5:1 to about 3.5:1.

Optionally, to obtain a certain particle size, the magnesium chloride-alcohol can be isolated by spray drying or filtered solids can be ground or milled. Other techniques for particle size control can also be used.

Preferably, the magnesium chloride-alcohol support has a surface area in the range of about 50 to about 1000 $m^2/g$, more preferably from about 100 to about 500 $m^2/g$, and most preferably from about 250 to about 350 $m^2/g$. Preferably, the pore volume is in the range of about 0.05 to about 2.0 mL/g, more preferably from about 0.1 to about 1.0 mL/g, and most preferably from about 0.4 to about 0.8 mL/g. Preferably, the average particle size of the magnesium chloride-alcohol support is in the range of about 1 to about 500 microns, more preferably from about 2 to about 200 microns, and most preferably from about 10 to about 100 microns. The average pore diameter is typically in the range of about 5 to about 400 angstroms, preferably about 10 to about 200 angstroms, and most preferably about 80 to about 160 angstroms.

The supported organometallic complex is preferably made by adding a solution of the complex to the magnesium chloride-alcohol support. Preferably, the mixture is stirred in an inert atmosphere at a temperature of from about 0° C. to about 120° C., more preferably from about 20° C. to about 40° C. The optimum stirring time will vary somewhat, depending upon the amounts of solvent and support material, but should be long enough to ensure good mixing. Preferably, the stirring time is from about 2 minutes to about 120 minutes. Stirring longer than 120 minutes should not decrease activity, but it is unnecessary. Stirring 30 minutes at room temperature is convenient and gives good results. Alternatively, an incipient-wetness technique can be used to deposit the complex on the magnesium chloride-alcohol support.

Preferably, ethylene is copolymerized with an alpha-olefin. Suitable alpha-olefins are $C_3$–$C_{20}$ alpha-olefins, such as propylene, 1-butene, 1-hexene and 1-octene, cyclic olefins such as cyclopentene and cyclohexene, and nonconjugated dienes such as ethylidene norbornene and mixtures thereof. Preferred alpha-olefins are propylene, 1-butene, 1-hexene, 1-octene, and mixtures thereof.

Hydrogen is optionally used in the polymerization to regulate the molecular weight. The amount of hydrogen needed depends upon the desired polyolefin molecular weight and melt flow properties. Generally, as the amount of hydrogen is increased, the polyolefin molecular weight decreases and the melt flow increases. For many applications, the polyolefin melt flow will be too low if the polymerization is done in the absence of hydrogen.

The olefin is polymerized in the presence of an activator. Suitable activators include alumoxanes, alkyl aluminum compounds, organoboranes, ionic borates, ionic aluminates, aluminoboronates and mixtures thereof. Examples include methyl alumoxane (MAO), polymeric MAO (PMAO), ethyl alumoxane, diisobutyl alumoxane, lithium tetrakis(pentafluorophenyl) borate, dimethylanilinium tetrakis(pentafluorophenyl)borate, trityl tetrakis(pentafluorophenyl)borate, tris(pentafluorophenyl)borane, triphenylborane, tri-n-octylborane, and the like, and mixtures thereof. Preferably, the activator is methylalumoxane. Selection of activator depends on many factors including the organometallic complex used and the desired polymer properties.

There are many suitable ways to introduce the activator. For example, the activator can be added directly to the polymerization reactor. In one preferred embodiment, a solution of the activator is added to the magnesium chloride-alcohol support material prior to the addition of the organometallic complex. More preferably, the organometallic complex is premixed with a solution of the activator prior to addition to the magnesium chloride-alcohol support material. Preferably, the organometallic complex and activator solution are premixed for a period of time between 1 minute and two hours. When the organometallic complex is premixed with a solution of the activator, optionally a portion of the activator can be premixed and the remainder of the activator added to the reactor.

Preferably, a scavenging amount of an alkyl aluminum compound such as triethyl aluminum or triisobutyl aluminum is also added to the polymerization reactor. Preferably, the alkyl aluminum compound is added to the reactor prior to the addition of the supported complex.

A wide variety of olefin polymerization processes can be used. Preferred processes are slurry and gas-phase processes.

The polymerizations can be performed over a wide temperature range, such as about −30° C. to about 280° C. A more preferred range is from about 10° C. to about 180° C.; most preferred is the range from about 30° C. to about 100° C. Olefin partial pressures normally range from about 0.1 MPa to about 350 MPa. More preferred is the range from about 0.2 MPa to about 7 MPa.

Catalyst concentrations used for the olefin polymerization depend on many factors. Preferably, however, the concentration ranges from about 0.01 micromoles transition metal per liter to about 100 micromoles per liter. Polymerization times depend on the type of process, the catalyst concentration, and other factors. Generally, polymerizations are complete within several seconds to several hours.

The following examples merely illustrate the invention. Those skilled in the art will recognize many variations that are within the spirit of the invention and scope of the claims.

EXAMPLE 1

Indenoindolyl Complex Preparation 5,8-Dimethyl-5,10-dihydroindeno[1,2-b]indolylzirconium dichloride (1) is prepared in four steps as follows. First, 8-methyl-5,10-dihydroindeno[1,2-b]indole is prepared by reacting equimolar amounts of 1-indanone and p-tolylhydrazine hydrochloride in ethanol according to the method of Buu-Hoi (*J. Chem. Soc.* (1952) 2225). In step 2, the indole is N-methylated by first vigorously stirring it with concentrated aqueous sodium hydroxide, toluene, and a phase-transfer catalyst (octadecyltrimethylammonium bromide), then adding a 60% molar excess of chilled methyl iodide, refluxing for 3 hours, and performing a typical workup. In step 3, a toluene solution of the dimethylindole compound is deprotonated with n-butyllithium (50% molar excess), and the resulting precipitate, an indenoindolyl anion, is washed with toluene and heptane. Finally, in step 4, the anion is reacted with an equivalent of cyclopentadienylzirconium trichloride in toluene/ether solution at room temperature to produce the desired complex, 1, which has $^1$H NMR spectra consistent with the structure.

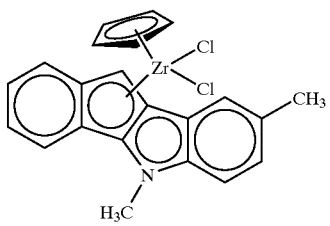

EXAMPLE 2

Preparation of Magnesium Chloride 3.5 EtOH

Under a nitrogen atmosphere, 5 grams of anhydrous magnesium chloride from Seal Chemical Industries is placed in a 500 mL round bottom flask. At room temperature the $MgCl_2$ is slurried with 20 mL of ethanol (200 proof from Aldrich) and 250 mL of mineral oil (Durasyn® 174 from BP Petrochemicals) (ethanol:$MgCl_2$ molar ratio=6:1). A condenser is attached to the flask, which is then heated to 110° C. using a hot oil bath. At 110° C., the solution begins to reflux and turns almost clear. After refluxing for an hour, the contents are transferred pneumatically using nitrogen pressure through a ¼" heat-taped Teflon tube into chilled heptane (0° C.), which is being stirred. After the contents of the reaction vessel are transferred to the chilled flask, the stirring is stopped and the solid is allowed to settle. The clear supernatant liquid is decanted and the solid (14.4 g) is collected on a glass frit. The solid is washed 3 times with heptane and then dried for 1 hour at 60° C. using a rotary evaporator at full vacuum. Dried solid (10.0 g) is collected. Based upon volatilized alcohol, the molar ratio of $MgCl_2$ to ethanol is 3.5.

COMPARATIVE EXAMPLE 3

Preparation of Complex 1 Supported on Anhydrous Magnesium Chloride

In a glovebox and at room temperature, 3.9 mL of 30% by weight methylalumoxane (MAO) in toluene is further diluted by mixing with 6 mL toluene. A 3.0-mL portion of this diluted MAO solution is mixed with 2.54 g of anhydrous magnesium chloride (from Seal Chemical Industries) for 30 minutes at room temperature. Complex 1 (from Example 1) (37.6 mg, 0.082 mmol) is mixed separately with the rest of the diluted MAO solution to make a deep orange-yellow solution. This solution is then mixed further with the slurry of 2.54 g $MgCl_2$ in diluted MAO/toluene. After stirring for 30 minutes at room temperature, the volatiles are removed by vacuum to obtain 3.92 g of supported catalyst.

EXAMPLE 4

Preparation of Complex 1 Supported on $MgCl_2$-3.5 EtOH

The procedure of Comparative Example 3 is generally followed except that $MgCl_2$–3.5 EtOH from Example 2 is used in place of anhydrous magnesium chloride.

COMPARATIVE EXAMPLE 5

Preparation of Complex 1 Supported on Silica

The procedure of Comparative Example 3 is generally followed except silica (Silica 948, available from Grace Davison Chemical Company and calcined at 600° C. for 4 hours) is used in place of anhydrous magnesium chloride.

EXAMPLE 6

Polymerization

To a 1-L stainless steel autoclave reactor, 85 mL of 1-hexene is added. Triisobutylaluminum (1.0 mL of 1.0 M solution in heptane, 1.0 mmol) and fatty amine (1 mg in 0.25 mL heptane solution; Stadis 425, product of Akzo Nobel) are mixed in one sidearm of the injector. This mixture is then flushed into the reactor with nitrogen pressure and isobutane (about 400 mL) and then pressurized with ethylene to 2.4 MPa. The reactor contents are allowed to equilibrate at 80° C. The supported catalyst from Example 4 (60 mg) is previously loaded into the other injector arm in a glovebox and then flushed into the reactor with isobutane (100 mL) and nitrogen pressure. The polymerization proceeds for 30 minutes. The reactor is vented and the polyolefin copolymer is collected and dried. Catalyst activity is 2.4 kg polyolefin per g supported catalyst per hour. The melt index (MI), measured according to ASTM D-1238, Condition E, is 0.46 dg/min. The polydispersity ($M_w/M_n$) of the polymer is measured by gel permeation chromatography (GPC) using 1,3,5-trichlorobenzene at 145° C. to be 2.8. ER, an elasticity parameter measured according to ASTM D4440–95A, as described in U.S. Pat. Nos. 5,534,472 and 6,713,585 and in R. Shroff and H. Mavridis, *J. Appl. Polym. Sci.* 57 (1995) 1605, is found to be 0.67. The density is measured by ASTM D-1505 to be 0.922 g/cm$^3$.

COMPARATIVE EXAMPLE 7

The procedure of Example 6 is generally followed with the supported catalyst from Comparative Example 3. The results are shown in Table 1.

COMPARATIVE EXAMPLE 8

The procedure of Example 6 is generally followed with the supported catalyst from Comparative Example 5. The results are shown in Table 1.

TABLE 1

| | Polymerizations | | | | | | |
|---|---|---|---|---|---|---|---|
| Example | Complex | Support | Activity | MI | $M_w/M_n$ | $E_R$ | density |
| 6 | Ex. 4 | $MgCl_2$.EtOH | 2.6 | 0.46 | 2.8 | 0.67 | 0.922 |
| C7 | C. Ex. 3 | $MgCl_2$ | 1.0 | 1.1 | 7.4 | 0.69 | 0.917 |
| C8 | C. Ex. 5 | $SiO_2$ | 2.1 | 1.1 | 2.7 | 0.28 | 0.921 |

Example 6 shows that magnesium chloride containing ethanol as a support gives remarkably improved activity versus anhydrous magnesium chloride (Comparative Example 7). Other benefits are that the molecular weight is higher (lower MI) and the polydispersity is much lower.

Example 6 also shows that magnesium chloride containing ethanol as a support gives higher molecular weight (lower MI) and higher $E_R$ versus silica (Comparative Example 8). Generally, a high ER indicates the presence of either long-chain branching or a high-molecular-weight component in the resin. If the $E_R$ is too high, some properties can be adversely affected. However, some amount of either long-chain branching or a high-molecular-weight component in the resin is beneficial. Generally, an $E_R$ of 2 is too high for many applications. The $E_R$ of Example 6 is high enough to impart elasticity without hurting other properties.

The preceding examples are meant only as illustrations. The following claims define the invention.

We claim:

1. A process which comprises polymerizing ethylene in the presence of a magnesium chloride-alcohol supported catalyst which comprises an organometallic complex and an activator wherein the organometallic complex comprises a Group 3 to 10 transition metal, M, and an indenoindolyl ligand that is bonded to M.

2. The process of claim 1 wherein the ethylene is copolymerized with at least one alpha-olefin selected from the group consisting of propylene, 1-butene, 1-hexene, 1-octene, and mixtures thereof.

3. The process of claim 1 wherein the alcohol is ethanol.

4. The process of claim 1 wherein the molar ratio of alcohol to magnesium is from about 2:1 to about 6:1.

5. The process of claim 1 wherein the Group 3 to 10 transition metal is a Group 4 transition metal.

6. The process of claim 1 wherein the activator is selected from the group consisting of alumoxanes, organoboranes, and ionic borates.

7. The process of claim 6 wherein the activator is methylalumoxane.

8. The process of claim 1 wherein the polymerization is performed at a temperature within the range of about 10° C. to about 180° C.

9. A slurry polymerization process of claim 1.

10. A gas-phase polymerization process of claim 1.

11. The process of claim 1 wherein the indenoindolyl ligand has a structure selected from the group consisting of:

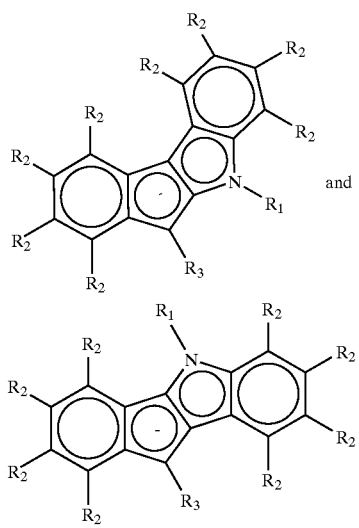

in which $R_1$, is selected from the group consisting of $C_1-C_{30}$ hydrocarbyl, dialkylboryl, and trialkylsilyl; each $R_2$ is independently selected from the group consisting of $C_1-C_{30}$ hydrocarbyl, H, F, Cl, and Br; $R_3$ is selected from the group consisting of $R_2$ and divalent radicals bonded to a second ligand wherein the divalent radical is selected from the group consisting of hydrocarbyl and heteroatom-containing alkylene radicals, diorganosilyl radicals, diorganogermanium radicals and diorganotin radicals.

12. The process of claim 1 wherein the organometallic complex has a structure selected from the group consisting of:

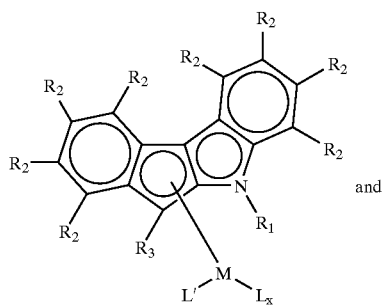

and

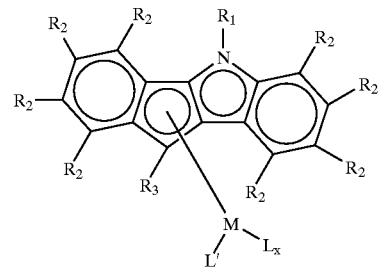

wherein M is a Group 3 to 10 transition metal; each L is independently selected from the group consisting of halide, alkoxy, aryloxy, siloxy, alkylamino, and $C_1-C_{30}$ hydrocarbyl; L' is selected from the group consisting of substituted or unsubstituted alkylamido, cyclopentadienyl, fluorenyl, indenyl, boraaryl, pyrrolyl, azaborolinyl and indenoindolyl; x satisfies the valence of M; $R_1$ is selected from the group consisting of $C_1-C_{30}$ hydrocarbyl, dialkylboryl, and trialkylsilyl; each $R_2$ is independently selected from the group consisting of $C_1-C_{30}$ hydrocarbyl, H, F, Cl, and Br; $R_3$ is selected from the group consisting of $R_2$ and divalent radicals bonded to L' wherein the divalent radical is selected from the group consisting of hydrocarbyl and heteroatom-containing alkylene radicals, diorganosilyl radicals, diorganogermanium radicals and diorganotin radicals.

13. The process of claim 12 wherein $R_3$ is H and L' is selected from the group consisting of substituted or unsubstituted cyclopentadienyl, fluorenyl, indenyl, and indenoindolyl.

* * * * *